United States Patent [19]

Herrera

[11] 4,019,882
[45] Apr. 26, 1977

[54] STACK GAS CLARIFIER

[76] Inventor: Andres Herrera, 12166 Loiza Station, Santurce, P.R. 00914

[22] Filed: Feb. 5, 1976

[21] Appl. No.: 655,357

[52] U.S. Cl. .................................. 55/220; 55/435; 55/468; 55/DIG. 30; 261/17; 261/DIG. 9; 110/119

[51] Int. Cl.² ............................. B01D 47/06

[58] Field of Search ............ 55/220, 222, 413, 414, 55/468, DIG. 20, 435, DIG. 30; 261/17, 126, DIG. 9; 110/119; 266/147, 157

[56] References Cited

UNITED STATES PATENTS

| | | | |
|---|---|---|---|
| 310,156 | 12/1884 | Vogel | 261/DIG. 9 |
| 2,228,970 | 1/1941 | Owens | 110/119 |
| 2,624,503 | 1/1953 | Kutcher | 55/468 |
| 3,442,232 | 5/1969 | White | 261/DIG. 9 |
| 3,582,051 | 6/1971 | Klein | 261/126 |
| 3,638,402 | 2/1972 | Thomas | 55/307 |
| 3,660,045 | 5/1972 | Gladu | 55/222 |

Primary Examiner—Frank W. Lutter
Assistant Examiner—David L. Lacey
Attorney, Agent, or Firm—Beveridge, DeGrandi, Kline & Lunsford

[57] ABSTRACT

A liquid spray-type stack gas clarifier is adapted to be mounted within existing stacks and supported therein from the top of the stack structure. Means are provided for maintaining gas flow velocity within the stack to compensate for pressure changes resulting from the cooling effect of the liquid spray curtain discharged into the stack to entrain and absorb particulate and gaseous pollutants from the stack gas. The spray liquid and absorbed pollutants are collected within and drained from the stack, and means may be provided for shielding existing stack structure from adverse effects of the scrubbing liquid.

7 Claims, 3 Drawing Figures

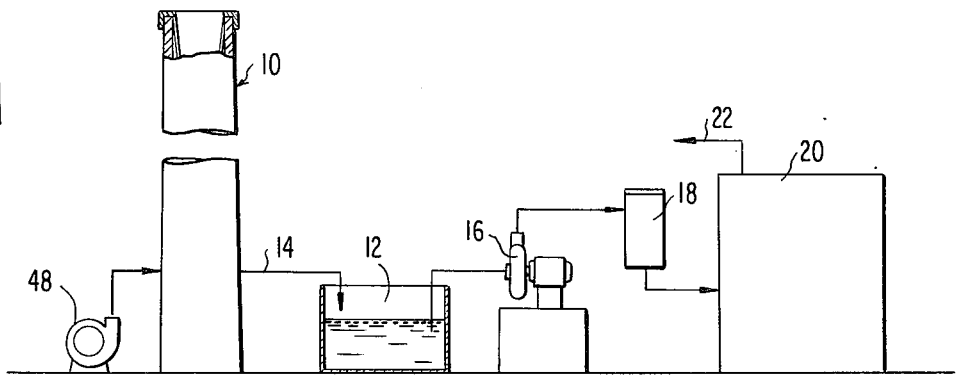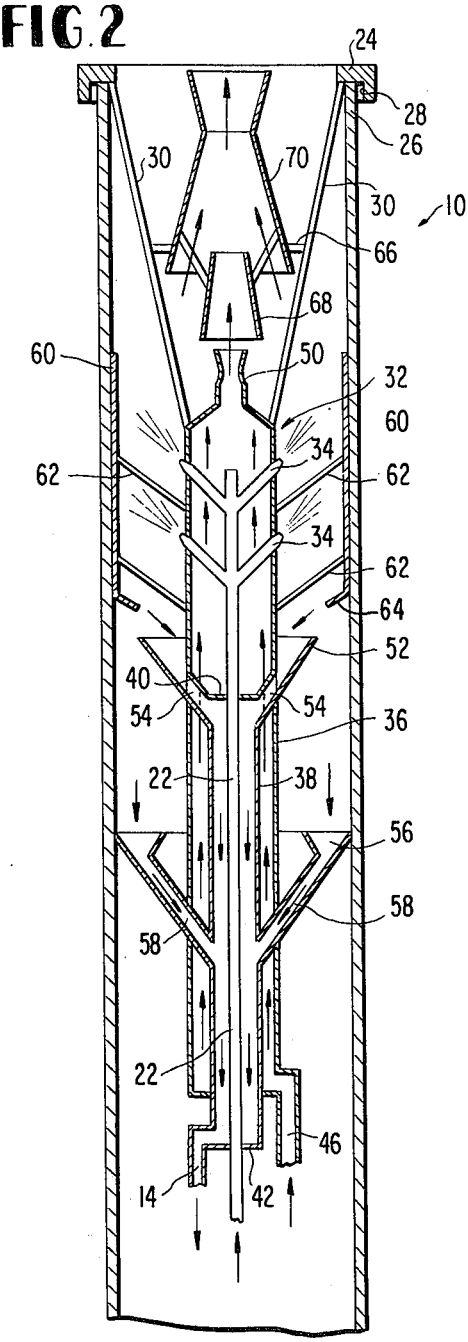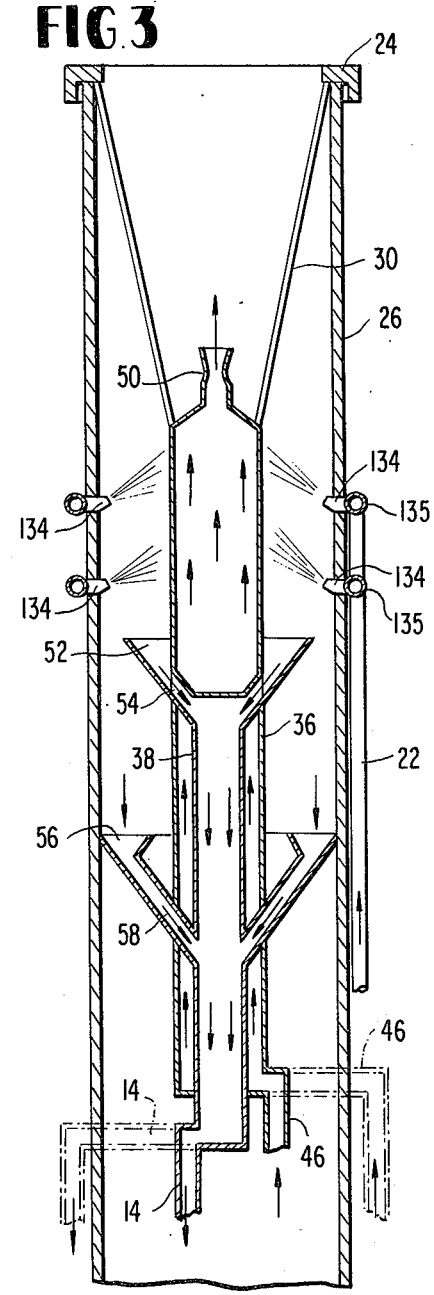

STACK GAS CLARIFIER

BACKGROUND OF THE INVENTION

1. Field of the Invention

This invention relates to apparatus for cleaning stack gases, and more particularly to a liquid spray apparatus for continuously washing or scrubbing stack gases for removing solid and gaseous pollutants therefrom.

2. Description of the Prior Art

A major source of air pollution is the smoke and noxious gases which are discharged directly into the atmosphere from smoke stacks. Many of the stack gases, particularly those from incinerators and certain industrial processes, contain substantial quantities of soluble gaseous pollutants and entrain substantial quantities of solid particulate matter which may be washed, or scrubbed, from the stack gas. Numerous washing devices have been developed and used for removing the particulate and soluble gaseous pollutants from stack gases, with these prior devices generally employing a system of nozzles for spraying a wash liquid directly into the gas stream to absorb or entrain the contaminates. The contaminated liquid is then collected from the gas stream to thereby prevent the pollutants from being discharged into the atmosphere.

Discharging the necessary volume of scrubbing liquid into the flow of gases in a stack will inherently materially alter the operating characteristics of the stack. Thus, a substantial pressure drop will result in the stack due both to the energy directly absorbed from the stack gas stream by the spray liquid and by the substantial reduction in temperature resulting from spraying the liquid into the normally high temperature gas stream. The resultant modification of stack flow characteristics will in most cases adversely effect the primary process whether it be the burning of trash in an incinerator, conventional fuels in a furnace, or other industrial process.

Various attempts have been made to solve the problems created by the introduction of scrubbing liquid into a stack gas stream, including use of means for inducing an increased stack velocity to compensate for reductions caused by the ingestion of liquid into the gaseous stream. These devices have, however, generally required special design of the stack and have not generally been readily adaptable to existing, conventionally designed stacks. Furthermore, these prior devices have generally been relatively expensive to manufacture and have been difficult to maintain and operate due to the relative inaccessibility of much of the apparatus.

SUMMARY OF THE INVENTION

In accordance with the present invention, an improved stack gas scrubbing apparatus is provided which may readily be installed within and used in connection with the operation of existing, conventionally designed stacks of a wide range of design configurations and operational characteristics. This is accomplished by providing a clarifier which is supported within the interior of a conventional stack by a hanging mechanism engaging the top rim of the stack and extending downwardly from the open top thereof to support the operational components of the clarifier concentrically within the stack in spaced relation to the open top. The apparatus includes a plurality of liquid spray nozzles arranged to discharge a scrubbing liquid in an upward and outward direction, with means being provided below the liquid spray nozzles for collecting the liquid and the pollutants carried thereby which fall within the stack. Means are also provided for discharging a high-pressure stream of gas concentrically within the stack and at a point spaced above the spray nozzles to maintain the desired gas velocity through the stack to assure proper flow of the stack gases through the stack.

In a prefered embodiment of the invention, the conduit supplying the scrubbing liquid is arranged coaxially within the stack, with the spray nozzles being directed upwardly and outwardly toward the inner walls of the stack. A sleeve member, supported by the scrubber support mechanism, surrounds the interior surface of the stack in the vicinity of the nozzles so that liquid reaching the outer portion of the stack will not harm the inner wall structure of the stack. Preferably, the sleeve terminates at its bottom end in an inwardly and downwardly inclined baffle, or skirt, to direct liquid flowing down the wall inwardly to the means for collecting the excess liquid.

In an alternate embodiment, the conduit supplying the pressure liquid extends externally of the stack structure, and the nozzles themselves are supported on annular conduits or manifolds with the nozzles projecting through openings in the stack wall to direct the liquid spray in inwardly and upwardly inclined paths merging toward the conduit for the pressured gas arranged centrally within the stack.

BRIEF DESCRIPTION OF THE DRAWING

The foregoing structure and its operation will become more apparent from the following detailed description, taken in conjunction with the drawings, in which:

FIG. 1 is a schematic illustration of a stack gas clarifying system according to the present invention;

FIG. 2 is a vertical sectional view through the top portion of the stack shown in FIG. 1 and illustrating the structural details of the clarifier; and FIG. 3 is a view similar to FIG. 2 and illustrating an alternate embodiment of the invention.

DESCRIPTION OF THE PREFERRED EMBODIMENTS

Referring now to the drawings in detail, a stack of conventional construction and of the type which may be employed with a conventional heating plant, incinerator, or the like, is designated generally by the reference numeral 10. Arranged at a point remote from the stack is a collecting and settling tank 12 which receives scrubbing fluid through conduit 14 from the interior of the stack. From the settling and clarifying tank 12, the scrubbing liquid is pumped, as by pump 16, through a filter 18 into a pressurized holding tank 20 from which it flows through pressure supply conduit 22 to the scrubbing apparatus illustrated in FIGS. 2 and 3 and supported on the open top of the stack 10.

Referring first to the embodiment of the invention illustrated in FIG. 2, a rigid support ring 24 is adapted to be seated upon the top edge of the wall 26 of stack 10, with the top of the stack being received in an undercut groove 28 in ring 24. A plurality of metal hanger bars 30 are rigidly welded to the ring 24 and extend downwardly at a slight inclined angle within the stack 10 to support the scrubber assembly within the stack.

The scrubber assembly supported on the hanger bars 30 is indicated generally by the reference numeral 32 and comprises three concentric conduits, the innermost of which is the upper end of pressure supply conduit 22. A plurality of spray nozzles 34 are mounted on the top end portion of conduit 22, with the nozzles extending upwardly and outwardly to the walls of the outer concentric conduit 36. Preferably the nozzles 34 are arranged in two vertically spaced, circumferentially offset rings each including a plurality of nozzles substantially equally spaced therearound, with the nozzles in the two rings being inclined at approximately 45 degrees from the horizontal to thereby direct the liquid spray in the desired upward and outward direction.

The central concentric conduit 38 has its upper and lower ends enclosed, as by annular flanges 40, 42, respectively, through which the inner conduit 22 passes, and the bottom end of conduit 38 is connected in fluid communication with the outlet conduit 14.

The outermost concentric conduit 36 has its lower end connected to a supply tube 46 which, in turn, is connected to a blower 48 (FIG. 1) for supplying pressure air to be discharged through a nozzle 50 mounted on the top end of conduit 36 to produce, by an aspiration effect, an increased gas velocity within the stack and thereby compensate for any reduced velocity caused by the liquid spray. The blower 48 may simply supply compressed air or alternatively may draw a portion of the gas which normally would be directed into the base of the stack and increase the pressure of this gas before it is discharged into the top of the stack.

An upwardly open annular, substantially V-shaped trough, or funnel 52, is formed around the outer periphery of the outer concentric conduit 36 in position to catch scrubbing liquid falling downwardly in the central portion of the stack 10. This liquid is conveyed, through two short drain tubes 54 inwardly into conduit 38 through which it flows downwardly and into conduit 14 to be conveyed to settling tank 12. A second annular, upwardly open trough member 56 is spaced below the trough 52, with the outer periphery trough 56 having an outer diameter substantially equal to the diameter of the interior of the stack wall 26 and having an inner diameter substantially greater than the diameter of the outer concentric conduit 36. Trough 56 is supported by a pair of short drain tubes 58 which are in fluid communication with the interior of the concentric tube 38. It is also noted that the outer diameter of the upper trough 52 is substantially equal to or slightly greater than the inner diameter of the trough 56 whereby there is no direct path downward through the stack so that scrubbing liquid discharged from the nozzles will tend to fall into one or the other of the two collecting troughs.

A cylindrical sleeve 60 having an outside diameter substantially equal to the inner diameter of the stack 10 is mounted on the outer concentric conduit 36 by suitable support arms 62. The sleeve 60 provides a shield for the inner surface of the stack walls 26 in the area of the liquid spray discharged from the nozzles 34 to protect the stack wall from the errosive and corrosive effect of the liquid and to prevent the liquid from collecting on and running down the walls of the stack. To this end, an inwardly and downwardly inclined annular baffle 64 is formed on the bottom end of the sleeve 60 to direct collected liquid into the interior portion of the stack to be collected by the troughs 52 and 56.

Mounted on the hanging bars 30 above the gas discharge nozzle 50, as by mounting bracket 66, is an aspirator assembly for increasing the flow velocity through the stack to compensate for any reduction in velocity, or back pressure, created by the liquid scrubbing operation. This aspirator assembly consists of a hollow frusto-conical member 68 mounted coaxially with and having its base spaced slightly above the discharge nozzle 50 and its smaller upper end positioned within the large open end of a venturi section 70. Thus, high pressure air discharged from the nozzle 50 will enter the larger open base of the conical member 68 and, at the same time, entrain stack gases into the cone, by an aspirator effect, to increase the velocity of the stack gases. This mixture of high pressure air and stack gases will, in turn, be discharged into the enlarged entrance of the venturi 70 to further increase the velocity of stack gases entering into the open base of the venturi around the conical member 68.

The embodiment illustrated in FIG. 3 differs from that just described primarily in that the liquid scrubbing solution is discharged into the stack gases in an inwardly and upwardly inclined direction rather than the outwardly and upwardly inclined direction just described. To this end, pressure inlet conduit 22 is mounted outside the stack rather than concentrically within the return conduit 38 and pressure gas conduit 36. Apart from this, the collection conduit, pressure gas conduit, and the liquid collection system supported concentrically within the stack are identical to that described and like reference numerals are applied thereto. It could also be mentioned that, by directing the scrubbing liquid inwardly, the necessity for the lining sleeve 60 of the embodiment of FIG. 2 might not be required in the FIG. 3 embodiment and is not illustrated. Similarly, the aspirator of FIG. 2 is not illustrated in the FIG. 3 embodiment, although it will be apparent that either of these structures may be used if desired.

The nozzles 134 employed to spray the scrubbing liquid into the stack gases are mounted on manifolds 135 connected in fluid communication with the conduit 22, with the nozzles 134 themselves projecting through openings formed in the wall 26 of the stack 10.

As illustrated in phantom lines in FIG. 3, the various supply and drain conduits may, if desired, be extended through the walls of the stack 10 at a point below the scrubbing assembly to facilitate maintenance of the plumbing and to remove these components from the hostile atmosphere which may exist within the stack. However, it may be desirable to maintain at least the pressure air conduit within the stack throughout a major portion of the stack height. Particularly where the hot combustion gases are employed as the pressure gas, to prevent excessive cooling which could result by placing the conduit outside the stack throughout the major portion of the height.

While I have disclosed and described preferred embodiments of my invention, I wish it understood that I do not intend to be restricted solely thereto, but rather that I do intend to include all embodiments thereof which would be apparent to one skilled in the art of which comes within the spirit and scope of my invention.

I claim:

1. Stack gas clarifying apparatus for mounting within and to remove particulate and soluble gaseous pollutants from stack gases passing upwardly through an upstanding smokestack comprising a wall portion having an outer periphery and an inner portion having an inner surface of a given inner diameter and within which stack gases may pass from the base portion to the top portion thereof, said stack gas clarifying apparatus including support means engageable with the top portion of and for supporting said apparatus within a smokestack with which said apparatus is to be used; a plurality of arms mounted on and projecting downwardly and inwardly from said support means; a scrubber assembly mounted on said arms and including first and second concentric conduits rigidly joined together and mounted on said arms in position to extend in substantially coaxial relation with a smokestack within which said apparatus is to be supported by said support means; inlet means for directing gas under pressure into said first concentric conduit; outlet means operatively connected to the lower end portion of said second conduit; a plurality of annular, upwardly open fluid collecting troughs extending around said concentric conduits in vertically spaced relation to one another; drain means providing fluid communication between said troughs and said second conduit; gas discharge means on the top end portion of said first conduit for directing a stream of gas under pressure upwardly above said concentric conduits and through the interior portion of a smokestack within which said apparatus is to be supported by said support means; a plurality of liquid spray nozzles mounted above said trough means in a position to discharge liquid under pressure in an upwardly inclined direction within a smokestack within which said apparatus is to be used; and a third conduit operatively connected to said nozzles for supplying a scrubbing liquid thereto.

2. Stack gas clarifying apparatus as specified in claim 1 wherein said scrubbing assembly includes aspirator means mounted above and in coaxial arrangement with said gas discharge means whereby gas under pressure discharged from said discharge means passes through said aspirator means to thereby induce an increased stack gas velocity above said nozzles and within the interior portion adjacent the top portion of a smokestack within which said apparatus is to be supported by said support means.

3. Stack gas clarifying apparatus as specified in claim 1 wherein said third conduit is supported in concentric relation with said first and second concentric conduits, and wherein said plurality of nozzles are supported in position to direct a fluid spray in an upward and outward direction within the interior portion of a smokestack within which said apparatus is to be supported by said support means.

4. Stack gas clarifying apparatus as specified in claim 3 and including an elongated substantially cylindrical sleeve having an outer diameter substantially equal to the inner diameter of a smokestack within which said apparatus is to be supported by said support means and positioned in an outwardly spaced relation from said nozzles, said sleeve terminating at its lower end in an inwardly and downwardly directed baffle to direct liquid flowing thereover inward away from the inner surface of a smokestack within which said apparatus is to be supported by said support means.

5. Stack gas clarifying appparatus as specified in claim 4 wherein said third conduit is the innermost of the concentric conduits and said first concentric conduit is the outermost.

6. Stack gas clarifying apparatus as specified in claim 5 wherein said drain means comprises a plurality of drain tubes extending from said troughs inwardly through said first concentric conduit and joined in fluid communication with said second concentric conduit.

7. Stack gas clarifying apparatus for mounting within and to remove particulate and soluble gaseous pollutants from stack gases passing upwardly through an upstanding smokestack comprising a wall portion having an outer periphery and an inner portion having an inner surface of a given inner diameter and within which stack gases may pass from the base portion to the top portion thereof, said stack gas clarifying apparatus including support means engageable with the top portion of and for supporting said apparatus within a smokestack with which said apparatus is to be used; a plurality of arms mounted on and projecting downwardly and inwardly from said support means; a scrubber assembly mounted on said arms and including first and second concentric conduits rigidly joined together and mounted on said arms in position to extend in substantially coaxial relation with a smokestack within which said apparatus is to be supported by said support means; inlet means for directing gas under pressure into said first concentric conduit; outlet means operatively connected to the lower end portion of said second conduit; a plurality of annular, upwardly open fluid collecting troughs extending around said concentric conduits in vertically spaced relation to one another; drain means providing fluid communication between said troughs and said second conduit; gas discharge means on the top end portion of said first conduit for directing a stream of gas under pressure upwardly above said concentric conduits and through the interior portion of a smokestack within which said apparatus is to be supported by said support means, and manifold means for extending around said first and second concentric conduits and in outwardly spaced relation thereto a distance sufficient to extend around the outer periphery of a smokestack within which said clarifying apparatus is to be supported by said support means, said manifold means including a plurality of liquid spray nozzles of a sufficient length and adpated to extend through openings formed in the wall portion of a smokestack within which said apparatus is to be used and for discharge of liquid therethrough to the inner portion of a smokestack within which said apparatus is to be used, and a third conduit operatively connected to said manifold means for supplying a scrubbing liquid thereto.

* * * * *